United States Patent [19]

Tanaka et al.

[11] Patent Number: 4,876,473
[45] Date of Patent: Oct. 24, 1989

[54] ARMATURE

[75] Inventors: Toshinori Tanaka; Shigekazu Miyazaki; Akira Morishita, all of Himeji, Japan

[73] Assignee: Mitsubishi Denki Kabushiki Kaisha, Tokyo, Japan

[21] Appl. No.: 221,823

[22] Filed: Jul. 20, 1988

[30] Foreign Application Priority Data

Jul. 20, 1987 [JP] Japan .......................... 62-110931[U]
Aug. 27, 1987 [JP] Japan .......................... 62-213298
Sep. 22, 1987 [JP] Japan .......................... 62-238104

[51] Int. Cl.⁴ ............................................ H02K 1/00
[52] U.S. Cl. .................................. 310/216; 310/45; 310/208; 310/215; 310/261
[58] Field of Search .............. 310/42, 45, 216, 217, 310/215, 179, 208, 261, 262, 264, 265, 267, 91, 198; 29/598; 336/210, 213, 221

[56] References Cited

U.S. PATENT DOCUMENTS

| | | | |
|---|---|---|---|
| 1,486,874 | 3/1924 | Frederkk | 310/215 |
| 3,246,188 | 4/1966 | McGarvey | 310/262 |
| 3,375,385 | 3/1968 | Young | 310/262 |
| 3,913,220 | 10/1975 | Miller | 29/598 |
| 4,400,639 | 8/1983 | Kobayashi | 310/215 |
| 4,401,252 | 8/1983 | Hamano | 228/110 |
| 4,437,230 | 3/1984 | Greutmann | 29/598 |

FOREIGN PATENT DOCUMENTS

| | | | |
|---|---|---|---|
| 0028264 | 10/1984 | European Pat. Off. | |
| 0714022 | 10/1941 | Fed. Rep. of Germany | 310/215 |
| 0137608 | 10/1979 | Japan | 310/216 |
| 0140106 | 10/1979 | Japan | 310/215 |
| 0011301 | 5/1906 | United Kingdom | 310/262 |
| 0693947 | 7/1953 | United Kingdom | 310/265 |

Primary Examiner—R. Skudy
Attorney, Agent, or Firm—Sughrue, Mion, Zinn, Macpeak & Seas

[57] ABSTRACT

In an armature (10) of DC motor, plural first slots (12A) and at least one second slot (12B) of larger width than the first slots (12A) are formed in a core-sheet lamination assembly (11), and both wrapping end parts (4a, 4b) of an insulation paper are always overlapped each other in the second slot (12B).

6 Claims, 10 Drawing Sheets

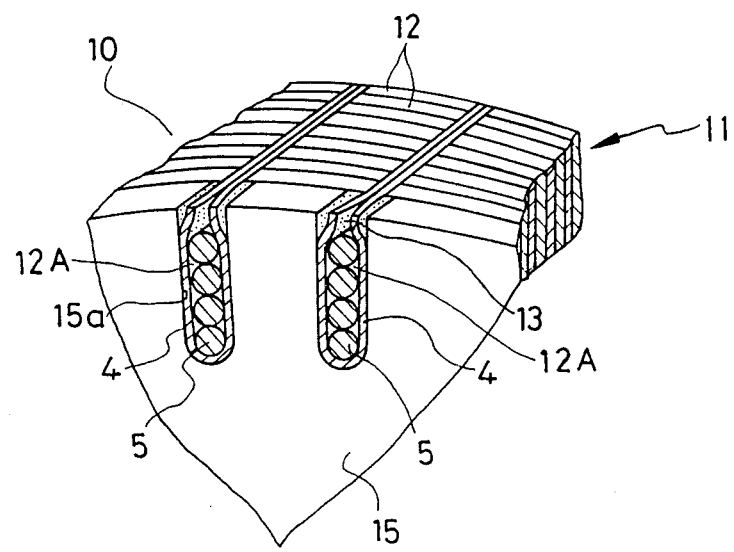

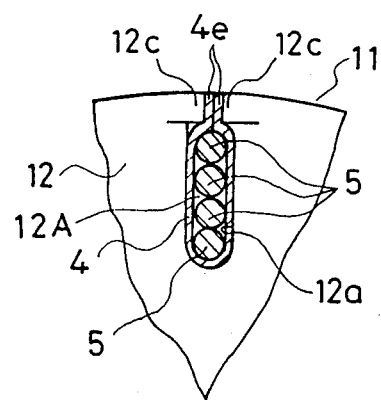
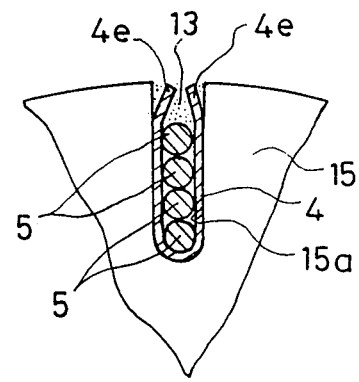
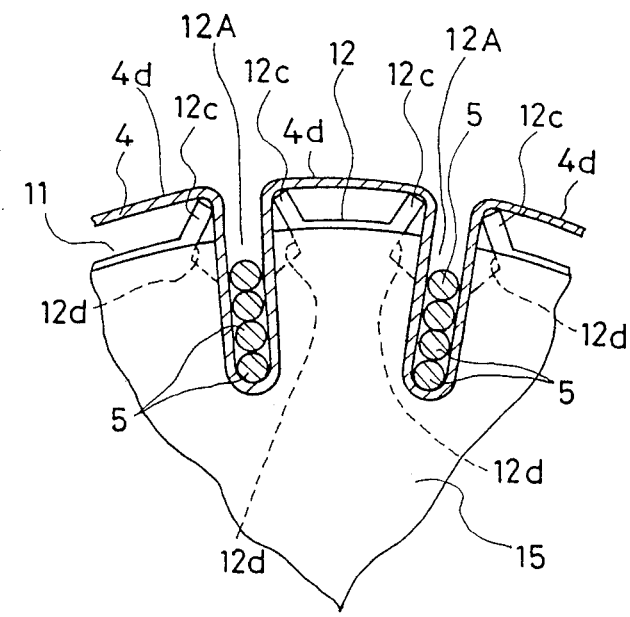

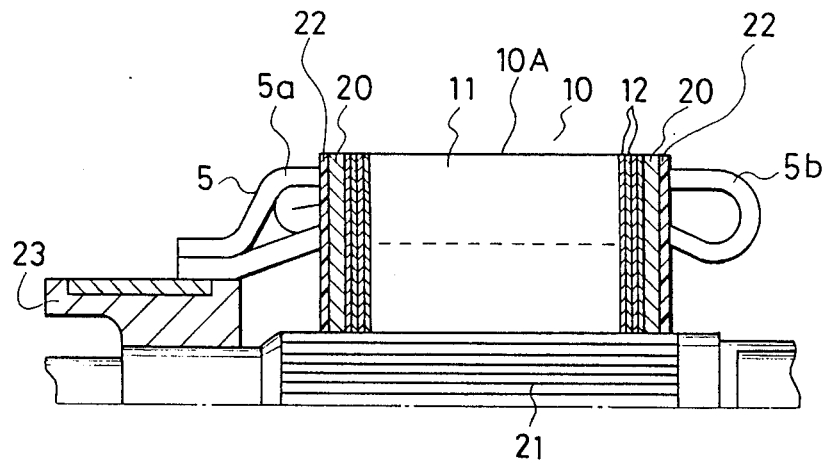
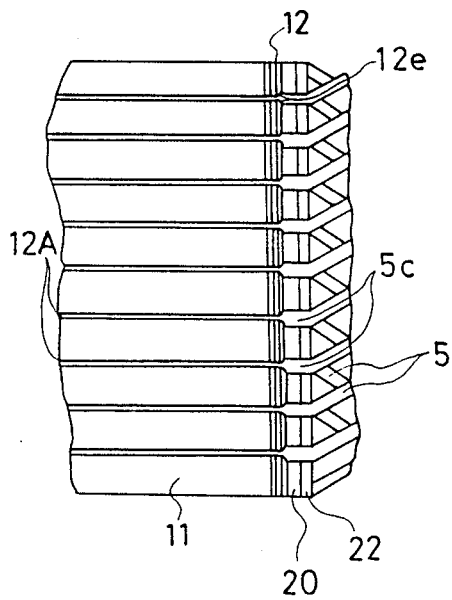
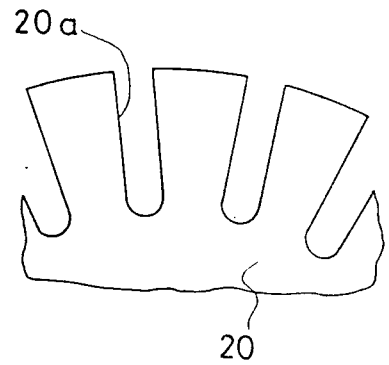

ARMATURE

FIELD OF THE INVENTION AND RELATED ART STATEMENT

1. Field of the Invention

The present invention relates to an armature of a DC motor.

2. Description of the Related Art

FIG. 13 is a perspective view showing a part of a conventional armature of a DC motor. In the figure, an armature comprises a core-sheet lamination assembly 3 which is composed of a lamination of plural core-sheets 2. FIG. 12 is a plane view of the core-sheet 2. As shown in the figure, the core-sheet 2 has plural oblong apertures 2a which are arranged at regular intervals along a circumference thereof. Each of the oblong apertures 2a is elongated in the radial direction of the core-sheet 2, and opens to the circumference of the core-sheet 2 with a pair of projections 2c retained. In FIG. 13, plural core-sheets 2 are laminated so that the oblong apertures 2a are aligned in an axial direction of the armature, thereby to form the slot 2A in the axial direction of the armature. Several coils 5 are mounted in this slot 2A whereon an insulation paper 4 is fitted. As shown in FIGS. 12 and 13, the projections 2c semienclose the slot 2A (the aperture 2a) in order to prevent the coils 5 from being forced out of the slot 2A by centrifugal force and shorten the apparent air-gap formed between an outer circumference of the core-sheet lamination assembly 3 and an internal circumference of a stator (not shown).

Next, working steps of the above-mentioned conventional armature are described. In a preliminary state before reaching the state shown in FIG. 12, the core-sheet 2 is formed in a configuration shown in FIG. 11. In the figure, a pair of the projections 2c are faced and projected outward in radial direction with inclinations toward center line of each aperture 2a, so that the aperture 2a opens outward. FIG. 14 is a cross-sectional view of the armature taken on the core-sheet 2. After laminating of plural core-sheets 2, not only an outer surface of the core-sheet lamination assembly 3 but also indented surfaces of the slots 2A are wrapped in the insulation paper 4. Next, plural coils 5 are mounted in the slots 2A, and the projections 2c are bent inward to semienclose the slots 2A, as shown in FIG. 12. At that time, an extended V-shaped concave 2d serves as a relief to smoothly bend the projections 2c. Thereafter, the outer surface of the core-sheet lamination assembly 3 is slightly cut, and thereby exposed portions 4d of the insulation paper 4 are removed. Thus, the core-sheet lamination assembly 3 as shown in FIG. 13 is completed.

Next, construction of an end part of the conventional armature is described. FIG. 16 is a cross-sectional view of the conventional armature taken on the insulation sheet 7 attached to an end sheet of the core-sheet 2. In the figure, the insulation sheet 7 has U-shaped apertures 7a which precisely correspond to the apertures 2a. Each aperture 7a has the same width as the aperture 2a of the core-sheet 2, and that width is uniform from the aperture's top to bottom. This insulation sheet 7 is of a circular shape as a whole. After lamination of the plural core-sheets 2, two insulation sheets 7 are attached to respective end sheets of the core-sheets 2 in an axial direction thereof. The aperture 7a is also wrapped in the insulation paper 4. After that, as aforementioned, the projections 2c are bent inward to semienclose the slots 2A, and the outer surface of the core-sheet lamination assembly 3 is slightly cut, thereby to remove the exposed portions 4d of the insulation paper 4. FIG. 17 is a plane view of a part of the armature. The insulation sheet 7 is provided so that a bent part 5c of the coil 5, which is led out of the slot 2A to the axial direction of the core-sheet lamination assembly 3, does not directly touch the core-sheet 2 of metal. Therefore, as shown in FIG. 16, it has been enough for the insulation sheet 7 to have a smaller diameter than that of the core-sheet 2.

In the above-mentioned conventional armature, there has been some problems as described hereafter.

FIG. 15(a) and FIG. 15(b) are cross-sectional views of the armature taken on the core-sheet 2. It is a desirable state that an end part 4a of the insulation paper 4 and the other end part 4b thereof touch with each other.

However, such a state may occur that the two end parts 4a and 4b of the insulation paper 4 overlap each other as shown in FIG. 15(a) or that the two end parts 4a and 4b do not reach each other as shown in FIG. 15(b), for instance, owing to a working error. Hereupon, each aperture 2a has a uniform configuration, and when the insulation paper 4 is fitted over the indented surface of the slot 2A, there remains the same width as the diameter of the coil 5 in the slot 2A. Therefore, as shown in FIG. 15(a), when both end parts 4a and 4b overlap each other, the overlapped part presents some coils 5 from fully entering in the slot 2A. The highest one of the coils 5, namely the most outside one in a radial direction of the core-sheet 2, stays between the projections 2c and 2c. As a result, at the time when the both projections 2c are bent to semienclose the slot 2A, the highest one of the coil 5 is squeezed into the slot 2A by the two projections 2c, 2c. Thereby, an insulation film which is coated on a surface of the coil 5 may be broken, thereby resulting in a short-circuit.

Further, in FIG. 15(b), since a part of the slot 2A (the aperture 2a) is exposed between the both end parts 4a and 4b, the coil 5, which is bent at both ends of the core-sheet lamination assembly 3 as shown in FIG. 17, may directly touch the exposed part of the slot 2A. As a result, the insulation film of the coil 5 is broken, thereby resulting in the short-circuit. If the insulation paper 4 are always fitted on the slot 2A in such a manner that the both end parts 4a and 4b just touch with each other, the above-mentioned problems do not occur. However, it is very difficult to fit the insulation paper 4 in the aforementioned manner.

Next, in FIG. 16, when the coil 5 mounted in the slot 2A is bent at an axial end part of the core-sheet lamination assembly 3, such a state may occur that the most outside one of the coils 5 rises higher than a predetermined position owing to the extended V-shaped concave 2d. In this state, when the projections 2c are bent to semienclose the slot 2A, the risen coil 5 is pressurized by the projections 2C under an abnormal contacting state. As a result, the insulation film of the coil 5 is broken, thereby resulting in grounding to the core-sheet 2 of metal.

Next, FIG. 18 is a plane partial view of the core-sheet lamination assembly 3 and the coil 5 at the end part of the armature. As shown in the figure, the projections 2c have a tendency to warp outward of the core-sheet lamination assembly 3. Furthermore, each coil 5 is bent at the end part of the core-sheet lamination assembly 3. Therefore, the coil 5 may touch an edge or the projections 2c of the core-sheet 2, thereby resulting in grounding.

OBJECT AND SUMMARY OF THE INVENTION

The object of the present invention is to offer an armature which prevents short-circuiting or grounding of a coil.

In order to achieve the above-mentioned object, an armature in accordance with the present invention comprises:

a core-sheet lamination assembly wherein a plurality of first slots and at least one second slot of larger width than the first slots are formed in an axial direction thereof by laminating a plurality of disk-shaped core-sheets, each of the core-sheets having a plurality of first radial apertures and at least one second radial aperture of larger width than said first aperture at regular intervals in a circumference thereof;

an insulation paper which is fitted on the first slots and the second slot, both wrapping end parts of the insulation paper being overlapped each other in the second slot; and a plurality of coils which are mounted in the first slots and the second slot.

BRIEF DESCRIPTION OF THE DRAWINGS

FIG. 4 is a perspective partial view showing an armature of an embodiment of the present invention.

FIG. 5(a) is a cross-sectional partial view of FIG. 4 taken on a core-sheet 12.

FIG. 5(b) is a cross-sectional partial view of FIG. 4 taken on an insulation sheet 15.

FIG. 6 is a cross-sectional partial view showing an armature of an embodiment of the present invention before cutting an insulation paper 4.

FIG. 7 is a front view showing an armature of another embodiment of the present invention.

FIG. 8 is a plane partial view showing an end part of an armature of another embodiment of the present invention.

FIG. 9 is a plane partial view showing a core-sheet having U-shaped slots in accordance with another embodiment of the present invention.

DESCRIPTION OF THE PREFERRED EMBODIMENT

Figure 2:
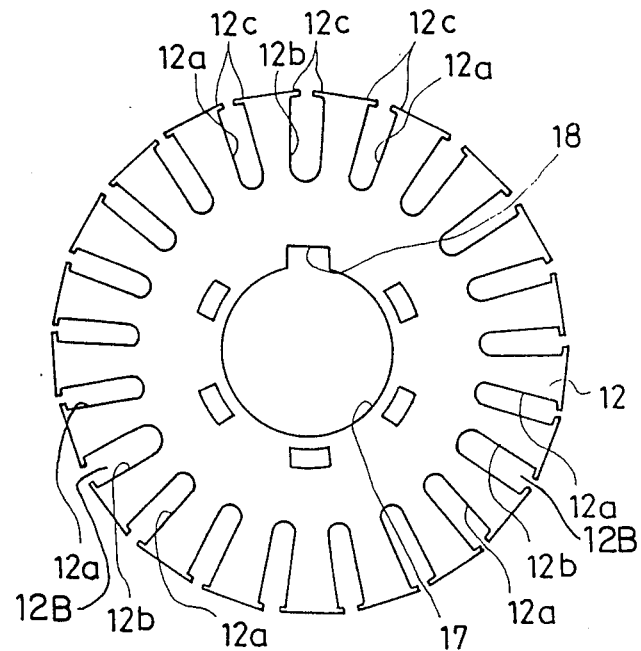
FIG. 2 is a plane view showing a core-sheet after assembly to an armature of an embodiment of the present invention.
Figure 3A:
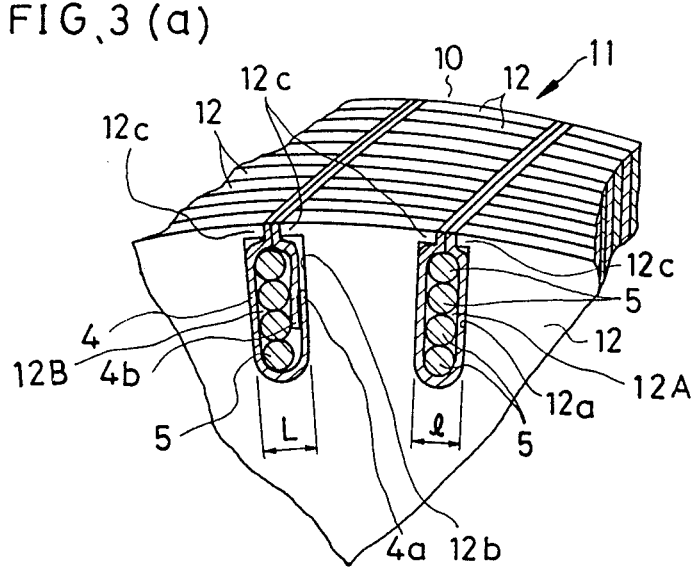
FIG. 3(a) is a perspective partial view showing an armature of an embodiment of the present invention.

Hereafter, preferred embodiments of the present invention are described with reference to the accompanying drawings. FIG. 3(a) is a perspective partial view of an armature, for instance, of a DC motor. In the figure, an armature 10 comprises a core-sheet lamination assembly 11 which is composed of a lamination of plural core-sheets 12. FIG. 2 is a plane view of the core-sheet 12. As shown in the figure, the core-sheet 12 has twenty-one oblong apertures 12a and 12b which are arranged at regular intervals in a circumference thereof. Each of the oblong apertures 12a and 12b is elongated in the radial direction of the core-sheet 12, and opens to the circumference of the core-sheet 12 with a pair of projections 12c retained. In FIG. 3(a), plural core-sheets 12 are laminated so that the oblong apertures 12a and 12b are aligned in an axial direction of the armature, thereby to form a first slot 12A and a second slot 12B in the axial direction of the armature, respectively. An insulation paper 4 is fitted in these slot 12A and 12B, and thereon four coils 5 are mounted. As shown in FIGS. 2 and 3(a), the projections 12c semienclose the first slot 12A and the second slot 12B (the apertures 12a and 12b) in order to prevent the coils 5 from being forced out of these slots 12A and 12B by centrifugal force and shorten the apparent air-gap formed between an outer circumference of the core-sheet lamination assembly 11 and an inner circumference of a stator (not shown).

Figure 1:
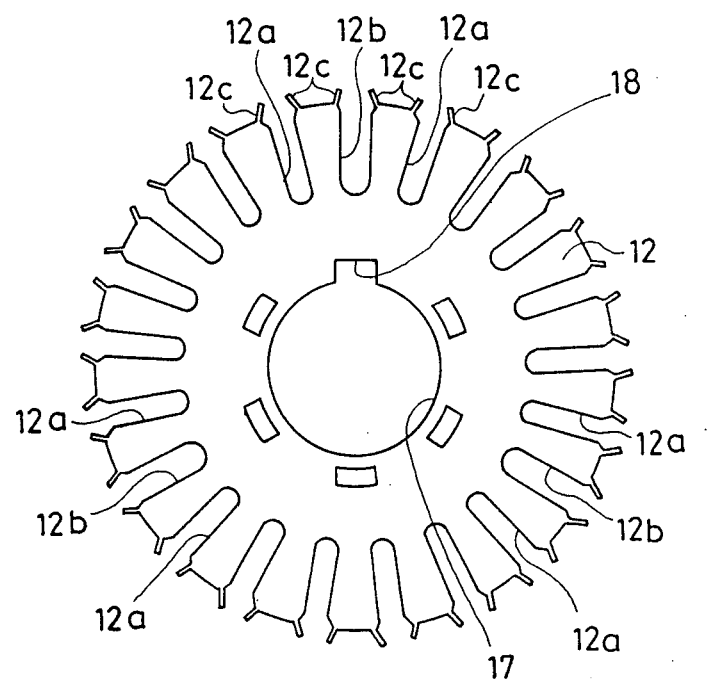
FIG. 1 is a plane view showing a core-sheet before assembly to an armature of an embodiment of the present invention.
Figure 3B:
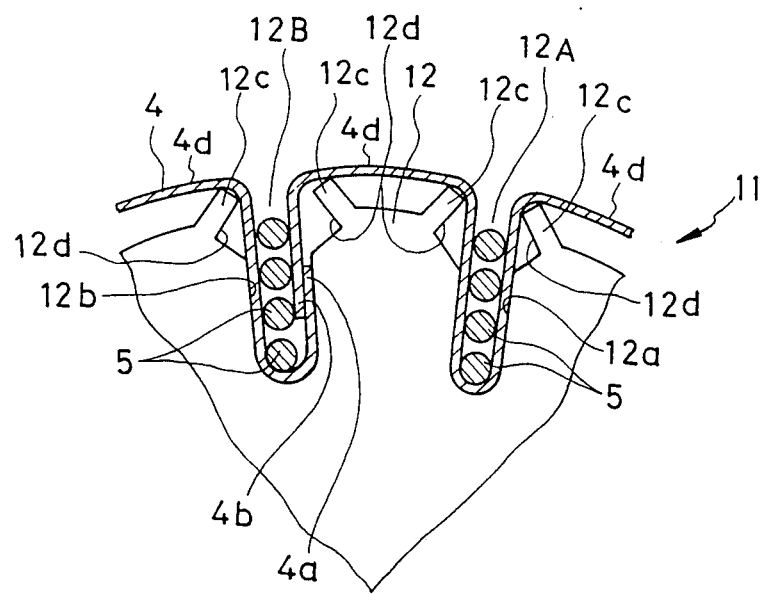
FIG. 3(b) is a cross-sectional partial view showing an armature of an embodiment of the present invention before cutting an insulation paper 4.

Next, working steps of the above-mentioned armature are described. In a preliminary state before reaching the state shown in FIG. 2, the core-sheet 12 is formed in a configuration shown in FIG. 1. In the figure, a pair of the projections 12c are faced and projected outward in radial direction with inclinations toward center line of each aperture 12a, so that the apertures 12a and 12b are open outward. FIG. 3(b) is a cross-sectional view of the armature under assembly taken on the core-sheets 12 in an axial direction thereof. In the figure, after laminating of plural core-sheets 12, not only an outer surface of the core-sheet lamination assembly 11 but also indented surfaces of the slots 12A and 12B are wrapped up in the insulation paper 4. Next, four coils 5 are mounted in the slots 12A and 12B, and the projections 12c are bent inward to semienclose the slots 12A and 12B, as shown in FIG. 2. At that time, an extended V-shaped concave 12d serves as a relief to smoothly bend the projections 12c. Thereafter, the outer surface of the core-sheet lamination assembly 11 is slightly cut, and thereby exposed portions 4d of the insulation paper 4 are removed. Thus, the core-sheet lamination assembly 11 as shown in FIG. 3(a) is completed. In FIG. 3(a), a width l of the first slot 12A holds the following relation:

$$l \approx 2m + d,$$

wherein:
m; thickness of the insulation paper 4,
d; diameter of the coil 5.

The width L of the second slot 12B is larger than the width l, that is:

$$L \approx 3m + d.$$

As shown in FIG. 3(a), when the two end parts 4a and 4b of the insulation paper 4 are overlapped, there remains the same width as a diameter of the coil 5 in the second slot 12B. Therefore, all of the coils 5 are smoothly and orderly mounted into predetermined positions in the second slot 12B, and no grounding short-circuit occurs. Thereupon, as shown in FIG. 3(b), the core-sheet lamination assembly 11 is wrapped in the insulation paper 4 in such a manner that the two end parts 4a and 4b always overlap each other in the second slot 12B. Working errors in wrapping of the insulation paper 4 are compensated by a change of overlapping lengths so as not to expose a surface of the second slot 12B.

Since the second slot 12B must be positioned at a start point of the insulation paper 4 and the end point thereof, the position of the second slot 12B should by easily recognizable to prevent mistakes in assembly. In this embodiment, as shown in FIG. 2, the second slot 12B is disposed just above a key groove 18 formed in a circumference of a center through-hole 17. Basically, it is sufficient to form only one second slot 12B in one core-sheet 12. But, when the core-sheet lamination assembly 11 is rotated, having only one second slot 12B cause as unbalance of centrifugal force owing to the greater width thereof. Thereby, the armature 10 may not rotate normally, for instance, noise or vibration may be produced. Therefore, to provide balance, from 2 to 4 of the second slots 12B are arranged in the circumference of the core-sheet 12 at regular intervals. Especially, in the core-sheet 2 having 21 slots, namely a multiple of three slots, three second slots 12B which are arranged at three equal intervals provide an excellent balance to the core-sheet lamination assembly 11.

Next, construction of an end part of the armature 10 is described. FIG. 4 is a perspective partial view of the armature 10 from a side of an insulation sheet 15 which is attached to an end sheet of the core-sheet 12. The insulation sheet 15 is made of such an insulation material as a fiber-sheet, and has a disk-shaped configuration as a whole and U-shaped apertures 15a which precisely correspond to the slot 12A of the core-sheet 12. A diameter of the insulation sheet 15 is nearly equal to or slightly smaller than a diameter of the core-sheet 12. Each aperture 15a has the same width as the aperture 12a (FIG. 3(a) of the core-sheet 12, and that width is uniform from the aperture's top to bottom.

FIG. 5(a) is a cross-sectional view of FIG. 4 taken on the core-sheet 12, and FIG. 5(b) is a cross-sectional view of FIG. 4 taken on the insulation sheet 15. In the core-sheet lamination assembly 11 as shown in FIG. 5(a), the end parts 4e of the insulation paper 4 touches each other as if they are folding their palms, and thereby the whole inner circumference of the slot 12A is covered by the insulation paper 4. On the other hand, in FIG. 5(b), the both end parts 4e are open, and a circumference of these end parts 4e is filled with a varnish, thereby to make the end parts 4e hard and close the aperture 15a of the insulation sheet 15. FIG. 6 is a cross-sectional partial view of the armature under assembly taken on the insulation sheet 15. In the figure, since the diameter of the insulation sheet 15 is nearly equal to or slightly smaller than that of the core-sheet 12, the extended V-shaped concave 12d is hidden behind the insulation sheet 15. Therefore, the slot 12A is ended by the aperture 15a of the insulation sheet 15 at both ends of the assembled core. The aperture 15a tightly holds the coils 5 in the predetermined position, so that the coils 5, especially the most outside coil 5, does not rise upward (radially outward) even if the coil 5 must be re-bent after coming out of the aperture 15a. Thereafter, the projections 12c are bent inward to semienclose the slot 12A. At that time, since the most outside coil 5 is kept in the predetermined position, it does not suffer damage by pushing of the projections 12c. Further, as aforementioned, since the aperture 15a is closed by the varnish together with the insulation paper 4, wrinkling of the insulation paper 4 is prevented at the time of cutting thereof.

Figure 10:
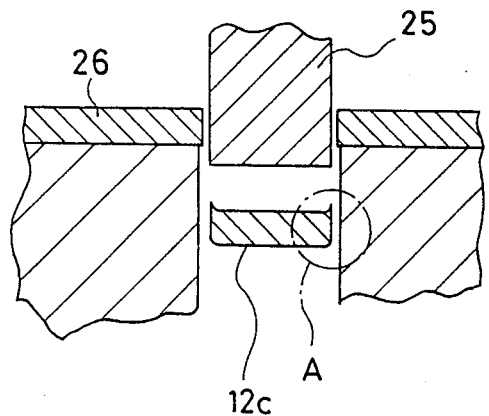
FIG. 10(a) is a cross-sectional view showing punching of a core-sheet by a press machine.
FIG. 10(b) is a cross-sectional view showing a part of a core-sheet which is punched out in FIG. 10(a).
Figure 10:
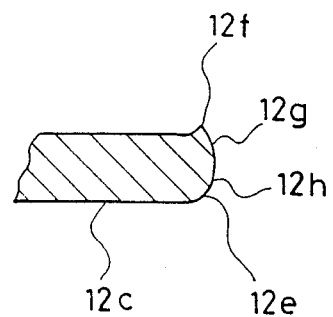
Figure 11:
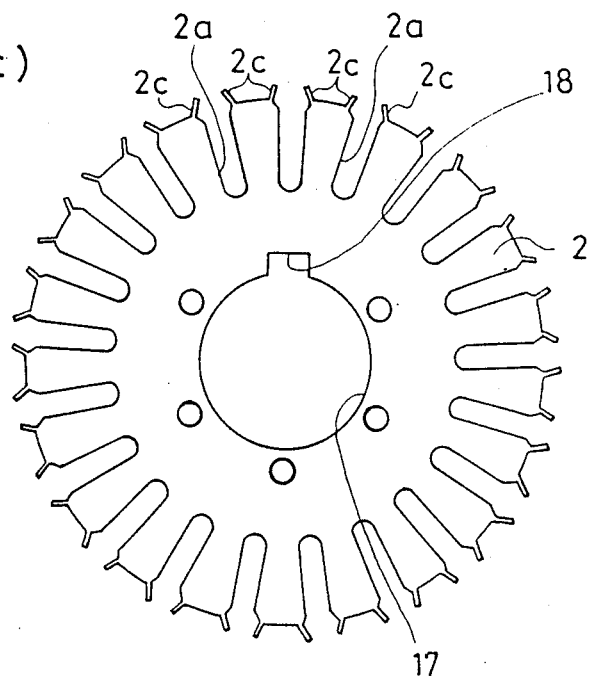
FIG. 11 is a plane view showing the core-sheet before assembly to the conventional armature.
Figure 12:
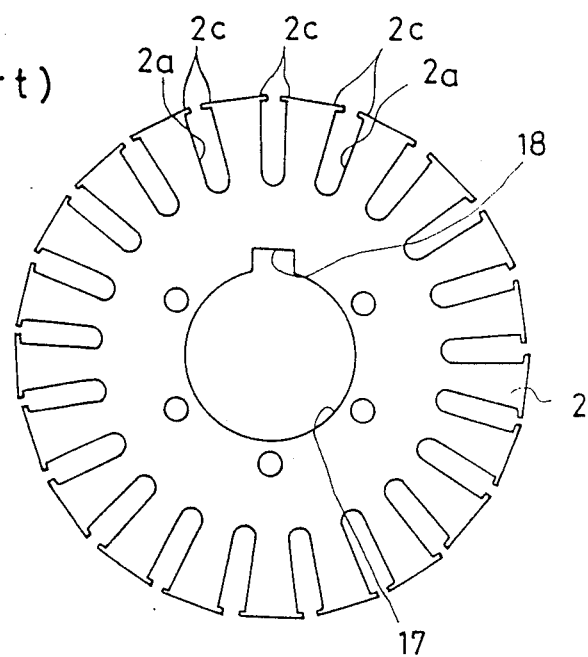
FIG. 12 is a plane view showing the core-sheet after assembly to the conventional armature.
Figure 13:
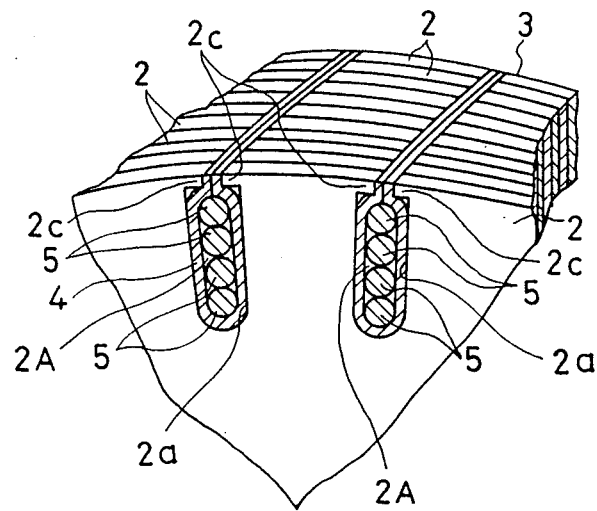
FIG. 13 is a perspective partial view showing the conventional armature.
Figure 14:
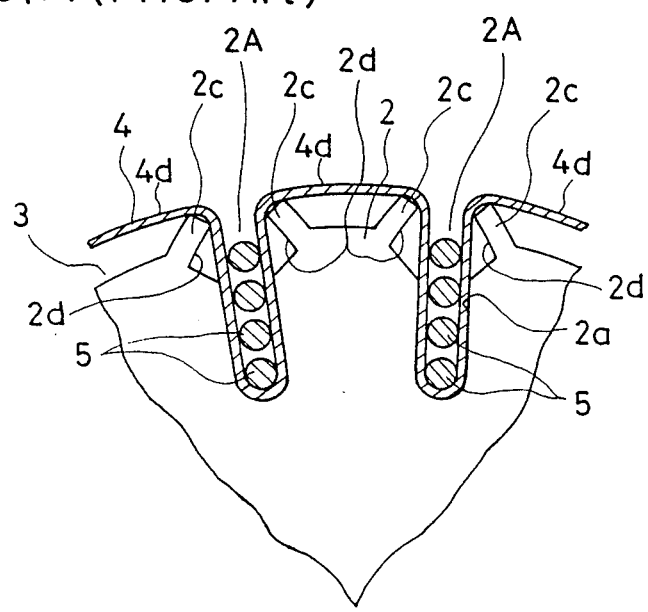
FIG. 14 is the cross-sectional view showing the conventional armature before cutting the insulation paper 4.
Figure 15A:
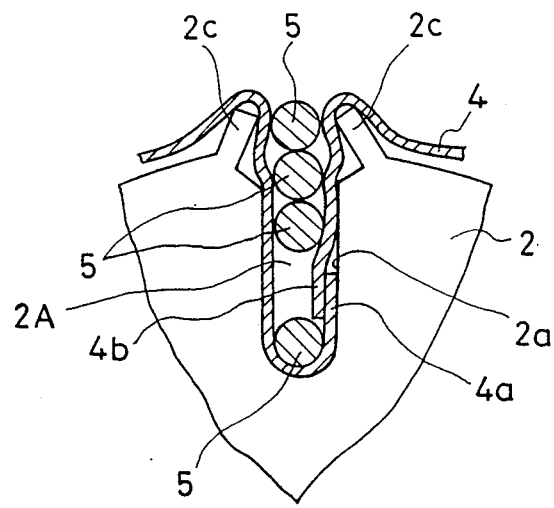
FIGS. 15(a) and 15(b) are cross-sectional partial views showing the conventional armature taken on the core-sheet 2.
Figure 15B:
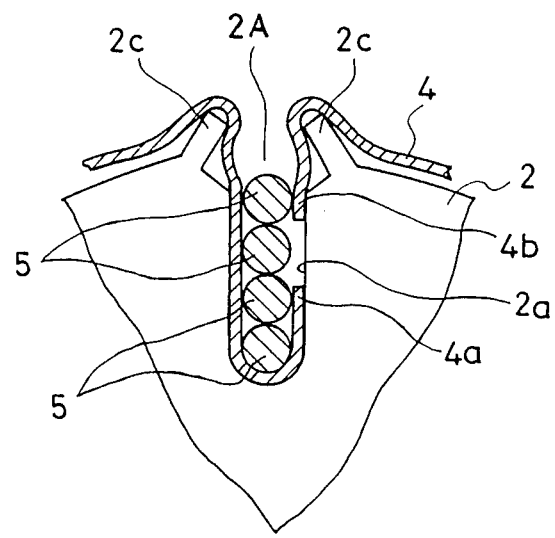
Figure 16:
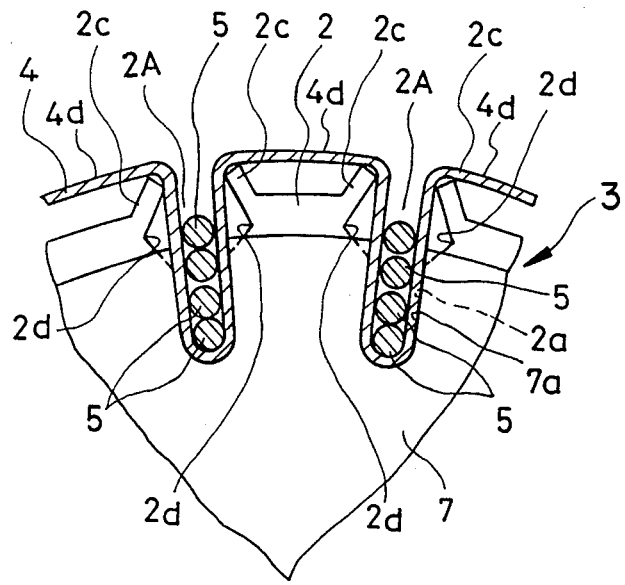
FIG. 16 is the cross-sectional partial view showing the conventional armature taken on the insulation sheet 7.
Figure 17:
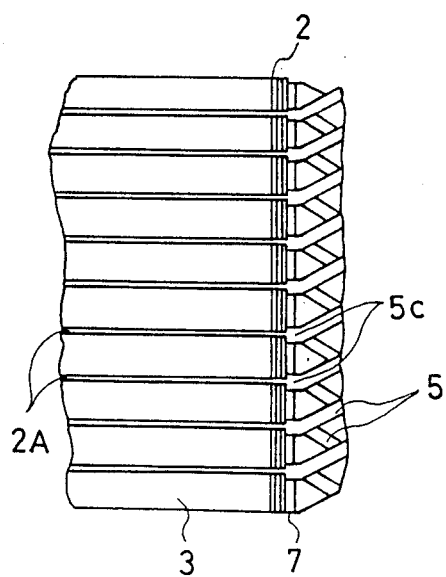
FIG. 17 is the plane partial view showing the end part of the conventional armature.
Figure 18:
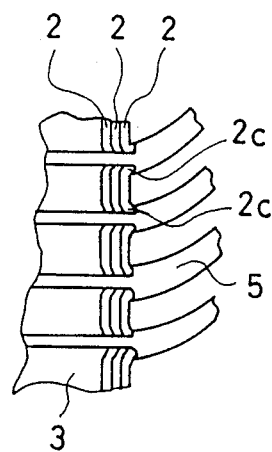
FIG. 18 is the plane partial view showing the core-sheet lamination assembly 3 and the coil 5 at the end part of the conventional armature.

Next, another embodiment of the present invention is described. FIG. 7 is a front view of the armature 10, and FIG. 8 is a plane partial view of an armature core 10A. This armature core 10A comprises the core-sheet lamination assembly 11 at a center part thereof, a pair of second cores 20 at both ends thereof and thereon a pair of insulation sheets 22. The second core 20 has plural U-shaped open apertures 20a as shown in FIG. 9, and is thicker than the core-sheet 12. The insulation sheet 22 has also plural U-shaped open apertures similar to that of the first embodiment. By providing the second core 20, the thickness of the insulation sheet 22 can be made thinner than that of the first embodiment. The armature core 10A is mounted on an armature rotation shaft 21. The coil 5 passes through the armature core 10A with coil end parts 5a and 5b exposed, and is connected to a commutator 23. In FIG. 8, round edges 12e of the core-sheet 12 are arrayed to direct outward of the core-sheet lamination assembly 11 (rightward of the figure). This round edge 12e is made by punching. As shown in FIG. 10(a), the projection 12c of the core-sheet 12 is punched out of a steel plate 26 by a press punch 25. FIG. 10(b) is an enlarged view of "A" in FIG. 10(a). On an end of the projection 12c, the round edge 12e, a sheared surface 12h, a break surface 12g and a burr 12f are formed. In FIG. 8, since a root part 5c of the coil 5 which is led out of the core-sheet lamination assembly 11 touches the round edge 12e, grounding short-circuit between the coil 5 and the core-sheet 12 is prevented. Though the grounding short-circuit generally liable to occur at the end part of the core-sheet lamination assembly 11, a risk of the grounding short-circuit is avoided owing to the construction that the second cores 20 having the U-shaped open apertures 20a are provided at both ends of the core-sheet lamination assembly 11. Thereby, the productivity of the armature is improved.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An armature comprising:
   a core-sheet lamination assembly comprising a plurality of laminated disk-shaped core sheets, a plurality of first slots and at least one second slot of larger width than said first slots being formed in an axial direction of said disk-shaped core-sheets, each of said core-sheets having a plurality of first radial apertures and at least one second radial aperture of larger width than said first aperture at regular intervals in a circumference thereof;

an insulation paper which is fitted in said first slots and said at least one second slot, wrapping end parts of said insulation paper overlapping each other in said second slot; and a plurality of multi-layered coils which are mounted in said first slots and said second slot, each of said coils comprising a single turn per layer.

2. An armature in accordance with claim 1, wherein from 2 to 4 second radial apertures are formed in each of said core-sheets at regular intervals in a circumference thereof.

3. An armature in accordance with claim 1, wherein said second radial aperture is larger than each of said first radial apertures by a thickness of said insulation paper.

4. An armature comprising:
a core-sheet lamination assembly comprising a plurality of disk-shaped core-sheets, a plurality of slots being formed in an axial direction, of said disk-shaped core-sheets at regular intervals and being open in a circumferential direction thereof, plural pairs of projections of said core-sheets semienclosing said slots;

a pair of disk-shaped insulation sheets, one of said disk-shaped insulation sheets being attached to each axial end of said core-sheet lamination assembly, each of said insulation sheets having a plurality of substantially U-shaped uni-width apertures corresponding to said slots by substantially the same width as said slots and substantially the same diameter as said core-sheets; and a plurality of coils which are mounted in said slots and said uni-width apertures.

5. An armature comprising:
a core-sheet lamination assembly comprising a plurality of disk-shaped core-sheets, a plurality of slots being formed in an axial direction of said disk-shaped core-sheets, said slots being formed at regular intervals and being open in a circumferential direction thereof, plural pairs of projections of said core-sheets semienclosing said apertures, said core-sheets having rounded edges directed outward in an axial direction of said core-sheet lamination assembly;

a pair of disk-shaped cores which are attached to both axial ends of said core-sheet lamination assembly, each of said cores having a plurality of substantially U-shaped open apertures corresponding to said slots;

a pair of disk-shaped insulation sheets, one of said insulation sheets being attached to an axial end of a respective one of said cores, each of said insulation sheets having a plurality of substantially U-shaped apertures corresponding to said slots; and a plurality of coils which are mounted in said slots and said open apertures.

6. An armature in accordance with claim 5, wherein a thickness of each of said disk-shaped cores is larger than that of each of said core-sheets.

* * * * *